United States Patent Office 3,323,866
Patented June 6, 1967

3,323,866
SYNTHESIS OF FLUORO COMPOUNDS
William B. Fox, Jefferson Township, Morris County, and James S. MacKenzie, Parsippany Troy Hills, N.J., assignors to Allied Chemical Corporation, New York, N.Y., a corporation of New York
No Drawing. Filed July 23, 1962, Ser. No. 214,157
14 Claims. (Cl. 23—203)

This invention relates to the compound $F_3NO \cdot BF_3$, and to processes for making and using the same.

In accordance with this invention, it has been found that when trifluoroamine oxide ($F_3NO$) and boron trifluoride ($BF_3$) are reacted under certain conditions, there is formed a new compound $F_3NO \cdot BF_3$ which is useful particularly as a chemical intermediate.

Boron trifluoride has a boiling point of about minus 101° C. at atmospheric pressure and a melting point of about minus 127° C., and is a colorless gas at normal conditions. The compound is commercially available.

Trifluoroamine oxide has a boiling point of about minus 89° C. at atmospheric pressure and a melting point of about minus 161° C., and is colorless gas at normal condition. The following illustrates procedures for making the compound.

EXAMPLE A

In this run, apparatus employed was substantially as follows. Sources of gaseous $OF_2$, gaseous $NF_3$, and gaseous helium were connected thru valve-controlled conduits with a 3.3 liter steel premixing tank equipped with a pressure gauge. The tank was connected thru a valve-controlled inlet conduit to the top of the vertically disposed inlet leg of a U-shaped quartz electric discharge tube, the upper end of the vertically disposed outlet leg of which was connected to an outlet conduit having a control valve, and a pressure gauge intermediate the exit of the discharge tube and the control valve. The quartz discharge tube provided a U-shaped reaction zone having a diameter of about 18 mm., and a total axial length of about 250 mm. Projecting into the upper end of the vertical legs of the discharge tube were nickel electrodes, axial distance between the ends of the electrodes within the reaction zone being about 100 mm. Outer ends of the electrodes were connected to a high voltage transformer. The tube outlet conduit, downstream of the control valve therein, was connected to the upstream end of a fractionation train comprising three series-connected U-tube traps. A conduit connecting the upper end outlet of the first U-tube with the upper end inlet of the second U-tube, and a conduit connecting the upper end outlet of the first U-tube with the upper end inlet of the third tube, were each provided with a control valve. The downstream end of the train was connected thru a valve-controlled conduit to a vacuum pump.

77.7 millimols of $OF_2$, 77.7 mmols. of $NF_3$, and 132 mmols. of helium and no other material were charged into the premix tank to provide a gas mixture therein having a total pressure of about 1590 mm. Source of supply to the premix tank was shut off, and the vacuum pump was put in operation to effectuate a high vacuum in the entire system including the electric discharge reaction tube and the fractionation train. The transformer was adjusted to impress across the electrodes a voltage of about 5 kilovolts at about 40 milliamperes. The valve in the gas line between the premix tank and the top end of the gas inlet leg of the discharge tube was opened. Operation of the vacuum pump at the tail end of the system and adjustment of the discharge tube inlet valve were such as to maintain throughout the run a pressure of about 10 to 15 mm. in the quartz discharge tube, such pressure being observable by the pressure gauge associated with the gas exit conduit of the discharge tube. Overall gas flow rate of the $OF_2$-$NF_3$-He mixture was about 187 mmols. per hour. Throughout the run, temperature in the quartz electric discharge tube was maintained at about minus 196° C. by means of a liquid nitrogen bath, and the tube glowed with a blue-to-violet color. Operation was continued for about an hour at which time the entire charge in the premix tank was expended.

On completion of the reaction run, the transformer was turned off, the valves in the inlet and outlet conduits of the discharge tube were closed, and the orange colored liquid and solid reaction mixture in the discharge tube was warmed up sufficiently to vaporize all of the reaction zone contents. Purpose of such vaporization was to effect destruction of $O_2F_2$ which decomposes to the oxygen and fluoride gases which are uncondensable under the conditions of operations. Other materials in the reaction zone were recondensed by reinstatement of minus 196° C. temperature in the reaction zone, and subsequent to the resulting condensation, the valve in the exit line of the discharge tube was opened, and uncondensable gases mostly oxygen and fluorine were purged from the system by the vacuum pump.

The material remaining in the discharge tube was subjected to fractional distillation by vaporizing such material while in the discharge tube and passing the resulting gas stream successively thru the three U-traps of the fractionation train. The first trap (the trap immediately adjacent the electric discharge tube) was maintained at a temperature of about minus 130° C. by immersion in a slush-like mixture of melting pentane. The second trap was maintained at temperature of about minus 183° C. by means of an oxygen bath, and the third trap was maintained at temperature of about minus 196° C. by means of a bath of liquid nitrogen. During fractionation, pressures in the entire system including the discharge tube and the three traps were maintained very low, e.g. from about 2 mm. up to about 5 mm. The first trap condensed out of the gas stream materials such as $NO_2$, NOF, $(NO_2)SiF_6$, $N_2O_3$, and $SiF_4$. In the second trap, minus 183° C., there were recovered about 10 mmols. of condensate. The third condensate contained $NF_3$. The 10 mmols. of condensate recovered in the minus 183° C. trap were shown by tests including molecular weight, infrared spectrum and mass spectrum to consist of 7 mmols. of a fluorine-nitrogen-oxygen compound and 3 mmols. of $N_2O$. Recovered fluorine-nitrogen-oxygen compound has been subjected to various physical and chemical tests and established to be $F_3NO$ of the structure

In accordance with the invention it has been found that when reactants, preferably consisting of trifluoroamine oxide and boron trifluoride, are brought together in a reaction zone maintained under certain reaction conditions, particularly conditions of low temperature, there is formed the compound $F_3NO \cdot BF_3$, a milk-white solid which is stable at temperatures below about minus 80° C. In general, practice of the process aspects of the invention comprise introducing into a reaction zone trifluoroamine oxide and boron trifluoride, and maintaining the material in the reaction zone at temperature below about minus 80° C. for residence time sufficient to form the solid $F_3NO \cdot BF_3$.

The reaction may be carried out in any suitable preferably bomb-type reactor which may be made for example of glass, nickel, or copper. The reactor should be adaptable for subjection to refrigeration such as to effect maintenance in the reactor of the herein described low temperatures. The reactor may be provided with reactant charging equipment which may include a valved outlet which facilitates sealing of the reactor and alternative opening of the same to afford connection of the reaction zone with a high vacuum suction conduit which in turn may have associated therewith various cold traps as will hereafter appear.

It has been found that when trifluoroamine oxide and boron trifluoride are brought together at temperature below about minus 80° C., even when both reactants are in gas phase, the $F_3NO.BF_3$ compound is formed.

At the minus 196° C. temperature of liquid nitrogen, both of the $F_3NO$ and $BF_3$ reactants are solids. These reactants, whether initially available as gases or liquids, are most conveniently introduced into the reactor by condensing the utilized quantities into the reactor while the latter is held at about minus 196° C. Subsequent to charging, the reactor may be evacuated at high vacuum, e.g. at pressures below about 10–15 mm. of Hg, to remove any noncondensables. While reaction may be carried out at substantially atmospheric pressure, preliminary substantial evacuation of the gas space in the reactor is preferred in order to avoid slowing down of reaction by autogeneous pressure which might develop during reaction.

On completion of charging, evacuation, and preferably sealing of the reactor, temperature therein is brought up preferably at least high enough so that the $F_3NO$ is converted to the liquid phase, i.e. the reactor may be warmed up to a few degrees C. above the minus 161° C. melting point of the $F_3NO$. The better temperature reaction conditions are those of liquid phase temperatures of at least $F_3NO$, and preferably also those of liquid phase temperature of $BF_3$. Hence, after charging of the reactor, temperature therein may be brought up to anything within the range of about minus 160° C. up to about minus 105° C., within which range reaction proceeds satisfactorily. While liquid phase temperatures of both reactants appear to enhance reactability, relatively low temperatures likewise promote reactability, and accordingly it is preferred to maintain in the reactor temperatures substantially in the range of minus 135° C. to minus 120° C. In this temperature range, the minus 120° C. minimizes presence of gas-phase $BF_3$, and the lower temperature of the lower portion of the range promotes reaction even though temperatures are such that any $BF_3$ present as such is more or less in the transition stage between solid and liquid.

With regard to molecular proportions of $BF_3$ and $F_3NO$ to be used in the reaction, stoichiometric requirements are thought to be about one to one, and such proportions may be employed. However, high consumption of $F_3NO$ during reaction has been indicated as highly desirable, and usually $BF_3$ is charged in excess, e.g. at least about 1.1 mol proportions of $BF_3$ per mol of $F_3NO$. In better embodiments, quantity of $BF_3$ employed is such as to provide not less than about two molecular portions of $BF_3$ per mol of $F_3NO$, and to insure substantially complete consumption of $F_3NO$, preferably about 3–4.5 molecular proportions of $BF_3$ are charged per mol of $F_3NO$. Greater quantities of $BF_3$ may be used although to no particular advantage.

Residence time of $F_3NO$ and $BF_3$ in the reactor is variable, depending to appreciable extent on other variables such as reaction temperature, proportions of reactants, and size of a particular operation. End point of reaction may be determined by infrared monitoring of samples of the gas over the solid product in the reactor. Substantial absence of readily detectable $F_3NO$ in such gas denotes completion of reactions. Reaction evidently initiates immediately, although not less than about 15 minutes residence time appears to be needed for notable reaction. Residence time for reasonably good results may be upward of 0.5 hour, more desirably not less than about one hour, and preferably 1–3 hours. For any given operation, optimum residence time may be determined by a test run or two.

On completion of reaction, material in the reaction zone comprises the $F_3NO.BF_3$ sought-for product which may contain relatively small amounts of compounds such as NOF, $NO_2F$, $SiF_4$, $N_2O$, and $NF_3$, some of which materials may have been brought in as impurities in the initial reactants and some of which may be reaction by-products. In accordance with the invention it has been found that the $F_3NO.BF_3$ product may be substantially purified in situ in the reaction zone. Such purification involves separating, from the solid $F_3NO.BF_3$ in the reaction zone, materials which are volatile at temperatures higher than about minus 135° C. and at pressure lower than about 5 mm. of Hg. To effect such purification, the reaction zone may be connected thru the valved outlet with a vacuum line operated at pressure lower than about 5 mm. of Hg. Preferably, the vacuum line includes a cold trap maintained at about minus 196° C. It has been found that impurities and by-products such as indicated may be stripped out of the $F_3NO.BF_3$ reaction mass by subjecting the same to evacuation at pressure below about 5 mm. of Hg and while maintaining the material being stripped at temperature substantially in the range of minus 120° C. to minus 135° C. Under these conditions, decomposition or other loss of $F_3NO.BF_3$ is minimized, and compounds such as unreacted $F_3NO$ and $BF_3$, and other by-products and impurities such as $N_2O$, $SiF_4$, $NO_2F$, NOF, and $NF_3$ effectively may be stripped out of the $F_3NO.BF_3$ reaction mass thus leaving in the reaction zone a substantially pure, solid $F_3NO.BF_3$. Volatiles pulled off during evacuation may be condensed out of the vacuum line by means of a minus 196° C. cold trap. Evacuation time is variable, and is dependent largely upon the size of a given operation. In small-scale work, 15–30 minutes may be adequate. However, in reasonably large scale operation, evacuation time should be at least about an hour, and usually in the range of 1 to 3 hours. Since the gases being removed may pass into a minus 196° C trap in a vacuum system, the end point of evacuation may be visually determined by noting whether additional material condenses on the walls of the liquid nitrogen trap.

Appended Example 1 illustrates production of the $F_3NO.BF_3$ product.

The $F_3NO.BF_3$ compound is useful as a chemical intermediate. One such utility lies in the purification of trifluoroamine oxide. As initially produced, for example as outlined in above Example A and depending upon such factors as variabilities of reaction conditions and purity of charged reactants, trifluoroamine oxide may contain, as impurities and/or reaction by-products, variable amounts of compounds such as $N_2O$, $SiF_4$, $NO_2F$, NOF, and $NF_3$. $N_2O$ is often a dominant impurity, and since the boiling points of $F_3NO$ and $N_2O$ are substantially the same, i.e. about minus 89° C., separation of $N_2O$ from $F_3NO$ may present a problem.

In accordance with this invention, relatively crude or impure trifluoroamine oxide may be readily handled, by relatively simple procedural techniques, to produce a highly pure trifluoroamine oxide. In connection with this aspect of the invention, it has been found that relatively impure trifluoroamine oxide, particularly a material substantially contaminated by nitrous oxide, may be treated with boron trifluoride in quantity sufficient to react with the $F_3NO$ constituent of the impure trifluoroamine oxide to form a $F_3NO.BF_3$ reaction mass which contains impurities such as noted above. Contained impurities may then be separated from the $F_3NO.BF_3$ reaction mass. For production of high purity $F_3NO$, to insure against loss of $F_3NO$, desirably not less than two mol proportions, preferably 2–4.5 mol proportions of $FB_3$ should be charged to the reaction zone per mol of $F_3NO$. Otherwise, technical procedures and manipulations to this point may substantially duplicate the above described methods for making relatively pure $F_3NO.BF_3$ compound, i.e. in general, reacting the initial impure $F_3NO$ material with preferably a substantial molecular excess of $BF_3$ to form a relatively crude $F_3NO \cdot BF_3$ reaction mass, and thereafter stripping out the contained impurities, all effected at low temperatures as described.

In the case of production of pure trifluoroamine oxide, the relatively pure $F_3NO \cdot BF_3$ product may be gradually brought up to abuot room temperature. Ordinarily, on reaching room temperature contents of the sealed reactor are dissociated to $F_3NO$ and $BF_3$. If desired, exterior warming of the reactor may be utilized to hasten dissociation of the $F_3NO \cdot BF_3$ compound to its $F_3NO$ and $BF_3$ components.

Having obtained, as above described, a gaseous room-temperature mixture of $F_3NO$ and $BF_3$, remaining expedients comprise separation of the two gases and recovery of pure $F_3NO$. It has been found that the $BF_3$ constituent of the gas mixture of $F_3NO$ and $BF_3$ may be readily separated from the gas mixture by treating the latter with an aqueous basic carbonate or hydroxide. Carbonates are not preferred because of possible contamination of $F_3NO$ by $CO_2$. Suitable basic hydroxides include alkali metal hydroxides such as NaOH and KOH, and other hydroxides such as $NF_4OH$, $Ba(OH)_2$ and $Mg(OH)_2$. NaOH is preferred, in which instance NaF and $H_3BO_3$, formed by reaction with the $BF_3$, are not volatile and remain in solution when $F_3NO$ is subsequently removed.

Incorporation of e.g. an NaOH solution with the gas mixture consisting of $F_3NO$ and $BF_3$ may be effected in any suitable manner, for example the gas mixture of $F_3NO$ and $BF_3$ may be condensed at low temperature into a vessel into which the desired amount of NaOH solution has been placed. After incorporation of the gas constituents with the NaOH solution, the resulting mass may be brought up to room temperature and if desired agitated for a time to facilitate completion of reaction of the $BF_3$ with the NaOH solution. However, the neutralizing reaction appears to be complete by the time the mass has thawed. On completion of reaction of $BF_3$ and NaOH, the $F_3NO$ gas remaining in the treating vessel may be run thru a cold trap, e.g. at temperature of minus 125° C. to minus 130° C. at pressure less than about 10 mm. of Hg, to separate out small amounts of water, the thus dried and highly purified $F_3NO$ may be condensed and recovered as a solid in a minus 196° C. cold trap.

Appended Examples 2 and 3 demonstrate use of the $F_3NO \cdot BF_3$ compound of the invention as intermediate in the production of pure trifluoroamine oxide.

*Example 1.*—The trifluoroamine oxide, $F_3NO$, employed was made substantially in accordance with above Example A. Prior to use in the present run, a trifluoroamine oxide product of Example A, containing small amounts of impurities such as $SiF_4$, $NO_2$, $N_2O$, and $NF_3$, was fractionated by running the same thru successive minus 160° C., minus 183° C. and minus 196° C. cold traps. After several hours of such fractionation, under high vacuum of about 2–5 mm., there was recovered from the minus 183° C. trap $F_3NO$ condensate which contained some $NF_3$ impurity but notably lesser amounts of other impurities such as noted above. The boron trifluoride, $BF_3$, employed was initially gaseous commercial material. Preliminarily, this $BF_3$ was charged into a minus 196° C. cold trap under high vacuum of about 0.001 mm. of Hg to remove noncondensables. No further purification of the $BF_3$ was effected.

After 1.74 mmols. of the above stripped $BF_3$, and then about 1.33 mmols. of the above $F_3NO$ condensate, were condensed into a 30 ml. glass bulb which was initially at a temperature of about minus 196° C. maintained by a liquid nitrogen bath. Immediately on addition of the $F_3NO$ some dark red color appeared. The top tip of the evacuated bulb was sealed off. Over a period of about 5 mins. the reaction bulb was permitted to warm up gradually, all reddish color fading out as temperature rose, and there was observed a white solid which, at about room temperature, disappeared and all contents of the sealed bulb were in gas phase. The bulb was cooled to minus 196° C. and warmed up to room temperature repeatedly. On each cooling of the bulb to about minus 80° C., the white solid re-formed. The temperature of the bulb and contents including white solid material was brought up to about minus 126° C. by means of a methylcyclohexane slush bath. The reaction bulb was opened and connected to a conduit operated under a high vacuum of about 0.001 mm. of Hg. Vapors taken off the reaction bulb over a period of about 2–3 min. were run thru a minus 196° C. trap in which there were recovered, at the pressure prevailing, about 0.65 mmol. of material which, by infrared analysis was shown to be a mixture of $F_3NO$ and $BF_3$ plus some $N_2O$ and $F_2NO$. During a further period of about 15 minutes the bulb was held at about the same temperature, and on continued vacuum pumping there were collected in the minus 196° C. trap about 0.38 mmol. of material which on infrared analysis was shown to be substantially only $BF_3$. The bulb was then warmed up to about room temperature at which time there was evolved in the bulb and withdrawn therefrom about 1.78 mmols. of vaporous material which resulted from dissociation of white solid in the bulb, leaving a negligly small amount of solid in the bulb. The vaporous material was determined by infrared analysis to be an equimolecular mixture of $F_3NO$ and $BF_3$.

*Example 2.*—The trifluoroamine oxide employed, initially in gas form, was made substantially in accordance with above Example A, and was relatively impure containing about 15% by volume $N_2O$, plus lesser amounts of other impurities such as $SiF_4$ and $NF_3$. The $BF_3$ utilized was gaseous commercial material. About 5.11 mmols. of impure $F_3NO$ and about 19.64 mmols. of $BF_3$ were condensed into a glass reaction bulb maintained at about minus 196° C. The bulb was evacuated after addition of the mixture and sealed. The sealed reaction bulb was transferred to immersion in a slush mixture of methylcyclohexane which brought temperature of material in the bulb up to about minus 126° C., at which temperature the bulb was held for about 2.5 hrs. The reaction bulb was opened, held at about minus 126° C., connected to a conduit operated under a high vacuum of about .001 mm. of Hg, and vacuum pumping was maintained for about 0.5 hr. Volatiles recovered amounted to about 12.93 mmols. of material which, by infrared analysis, was shown to be a mixture of $N_2O$, $SiF_4$ and $BF_3$. During a further period of about 2.5 hrs., the reaction bulb was held at about the same minus 126° C. temperature, and on continued vacuum pumping there were recovered about 2.46 mmols. of material, volatile at minus 126° C. and the pressure prevailing, which, on infrared analysis was shown to be substantially only $BF_3$. At this point the only material in the reaction bulb was a white powder solid $F_3NO.BF_3$ adduct. The reaction bulb was removed from the minus 126° C. bath, re-sealed, and, with aid of a warm air current, was warmed up during a period of about 10 min. to about room temperature, to effect dissociation of the solid $F_3NO.BF_3$ adduct. At about room temperature when all the contents of the reaction bulb were in gas phase, the bulb seal was broken and the gaseous contents thereof, shown by infrared analysis to be only $F_3NO$ and $BF_3$, were condensed at temperature of about minus 196° C. into a 100 ml. Pyrex shaking bulb into which had been introduced about 50 cc. of saturated $NaHCO_3$ solution. The shaking bulb was warmed up to about room temperature, and agitated for about 15 minutes, during which time the $F_3NO$ component of the $F_3NO.BF_3$ adduct vaporized, while the $BF_3$ component reacted with the $NaHCO_3$ to form $H_3BO_3$, NaF and some $CO_2$. After agitation, the shaking bulb was opened into a high vacuum line (pressure about .001 mm. of Hg) and the volatiles were passed first thru a minus 126° C. cold trap to remove $H_2O$, and then thru a minus 196° C.

trap. The solid condensate of the minus 196° C. trap was vaporized, shown by infrared analysis to contain only $F_3NO$ and a small amount of $CO_2$, and then condensed at temperature of about minus 196° C. into a second 100 ml. shaking bulb into which had been introduced about 50 cc. of 1 N NaOH solution. The second shaking bulb was warmed up to about room temperature, and agitated for about 10 minutes, after which time the second shaking bulb was opened into a vacuum line (pressure about 0.001 mm. of Hg), and the gas from the bulb passed successively thru minus 126° C. and minus 196° C. traps. Infrared analysis of the final minus 196° C. trap material, amounting to about 2.22 mmols, showed extremely high purity $F_3NO$ containing a no more than faintly detectable trace of one impurity, $N_2O$.

Example 3.—This run was substantially the same as the run of Example 2 except as follows. Larger quantities, i.e. about 30 mmols. of crude $F_3NO$ and about 120 mmols. of $BF_3$, were employed. In the present run, the gaseous mixture of $F_3NO$ and $BF_3$ resulting from the dissociation of the purified adduct was treated directly with a 2 N NaOH solution instead of the $NaHCO_3$ solution of Example 2. The gaseous $F_3NO$ remaining after agitation with the 2 N NaOH solution was handled as before, i.e. by passing the same at pressure of about .001 mm. of Hg thru a minus 126° C. trap to remove $H_2O$ and then into a minus 196° C. trap to recover the $F_3NO$ as condensate. Infrared analysis of the latter showed $F_3NO$ containing only a trace of $N_2O$.

It is notable that significant absorptions resulting from $N_2O$ (4.5 microns) and other impurities (8.0 and 9 microns) which appeared in the spectra of chromatogrammed samples of $F_3NO$ known to have purity greater than 99% are absent from spectra of $F_3NO$ samples purified as indicated above.

The $F_3NO$ compound, especially in the above indicated purified condition, provides a missile ingredient, a powerful high energy oxidizer for missile fuels, and an intermediate for the preparation of other high energy propellant oxidizers. The $F_3NO$ compound lowers substantially the freezing point of the known $N_2O_4$ oxidizer, and correspondingly increases the utility range of $N_2O_4$.

The trifluoroamine oxide product, $F_3NO$, and processess for making the same are more fully described and claimed in copending applications of MacKenzie, Fox and Vanderkooi, Serial No. 179,521 and of MacKenzie and Fox, Serial No. 179,520 each filed Mar. 9, 1962.

We claim:

1. The process for making the compound $F_3NO.BF_3$ which comprises introducing into a reaction zone trifluoroamine oxide and boron trifluoride, and maintaining the material in said reaction zone at temperature below about minus 80° C. for a residence time sufficient to form solid $F_3NO.BF_3$.

2. The process of claim 1 in which temperature is maintained substantially in the range of minus 105° C.–minus 160° C.

3. The process of claim 1 in which temperature is maintained substantially in the range of minus 120–135° C.

4. The process of claim 1 in which temperature is maintained substantially in the range of minus 105° C.–minus 160° C., and residence time is not less than about 0.5 hour.

5. The process of claim 1 in which boron trifluoride is introduced in amount in excess of one mol of $BF_3$ per mol of $F_3NO$.

6. The process for making the compound $F_3NO.BF_3$ which comprises introducing into a reaction zone trifluoroamine oxide and boron trifluoride, maintaining the said reaction zone at temperature below about minus 80° C. for a residence time sufficient to form solid $F_3NO.BF_3$, and separating, from the resulting solid $F_3NO.BF_3$, materials which are volatile at temperature higher than about minus 135° C. and at pressure lower than about 5 mm. of Hg.

7. The process for making the compound $F_3NO.BF_3$ which comprises introducing into a reaction zone trifluoroamine oxide and boron trifluoride, maintaining the material in said reaction zone at temperature substantially in the range of minus 105° C.–minus 160° C. for a residence time sufficient to form solid $F_3NO.BF_3$ containing impurities, and subjecting the resulting solid $F_3NO.BF_3$ to evacuation at temperature below about 120° C. and at pressure below about 5 mm. of Hg to separate impurities.

8. The process of claim 7 in which evacuation time is not less than about one hour.

9. The process of claim 7 in which boron trifluoride is introduced in amount substantially in the range of 3–4.5 mols of $BF_3$ per mol of $F_3NO$.

10. The process of claim 7 in which reaction zone temperature and evacuation temperature are each substantially in the range of minus 120–minus 135° C.; reaction zone residence time is not less than about 0.5 hour; and evacuation time is not less than about one hour.

11. The process which comprises introducing into a reaction zone boron trifluoride and trifluoroamine oxide containing impurities including $N_2O$, said $BF_3$ being in amount not less than about 2 mols per mol of $F_3NO$, maintaining the said reaction zone at temperature substantially in the range of minus 105° C.–minus 160° C. for a residence time sufficient to form solid $F_3NO.BF_3$ containing impurities, subjecting the said solid $F_3NO.BF_3$ to evacuation at temperature below about 120° C. and at pressure below about 5 mm. of Hg for a time sufficient to effect removal, from the said solid $F_3NO.BF_3$, of impurity materials which are volatile at the said temperature and pressure of evacuation; heating the resulting evacuated solid $F_3NO.BF_3$ to temperature sufficiently high to dissociate the same to a gaseous mixture of $F_3NO$ and $BF_3$, separating $BF_3$ from said mixture, and recovering substantially pure $F_3NO$.

12. The process which comprises introducing into a reaction zone boron trifluoride and trifluoroamine oxide containing impurities including $N_2O$, maintaining the said reaction zone at temperature substantially in the range of minus 105° C.–minus 160° C. for a residence time sufficient to form solid $F_3NO.BF_3$ containing impurities, subjecting the said solid $F_3NO.BF_3$ to evacuation at temperature below about 120° C. and at pressure below about 5 mm. of Hg for a time sufficient to effect removal, from the said solid $F_3NO.BF_3$, of impurity materials which are volatile at the said temperature and pressure of evacuation; heating the resulting evacuated solid $F_3NO.BF_3$ to temperature sufficiently high to dissociate the same to a gaseous mixture of $F_3NO$ and $BF_3$, subjecting said gaseous mixture to the action of an aqueous alkali metal hydroxide solution in amount and for a time sufficient to separate $BF_3$ from said mixture, dehydrating residual gaseous $F_3NO$, and recovering substantially pure $F_3NO$.

13. The process of claim 12 in which reaction zone temperature and evacuation temperature are each substantially in the range of minus 120–minus 135° C.; reaction zone residence time is not less than about 0.5 hour; and evacuation time is not less than about one hour.

14. A compound, of the empirical formula $F_3NO.BF_3$, which is a stable white solid at temperature below about minus 80° C.

References Cited

Glemser, "Angewandte Chemie," vol. 71, page 524 (1959).

OSCAR R. VERTIZ, Primary Examiner.

CARL D. QUARFORTH, Examiner.

J. D. VOIGHT, M. WEISSMAN, Assistant Examiners.